Oct. 31, 1944. J. TESSIER 2,361,667
PHOTOGRAPHIC ENLARGER
Filed May 8, 1940 5 Sheets-Sheet 3

Inventor,
J. Tessier
by Glascock Downing & Seebold
Attys

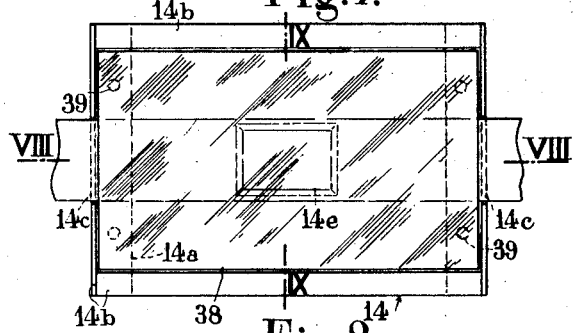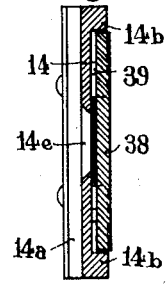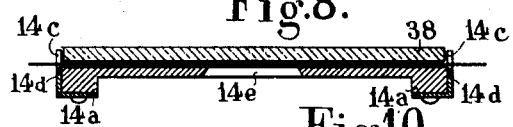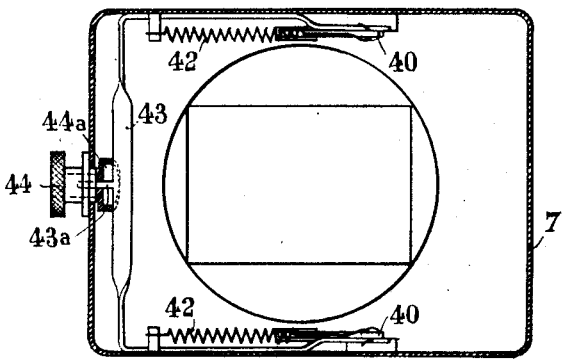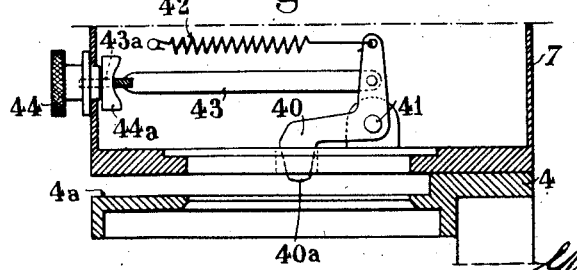

UNITED STATES PATENT OFFICE 2,361,667

PHOTOGRAPHIC ENLARGER

Julien Tessier, Clamart, France; vested in the Alien Property Custodian

Application May 8, 1940, Serial No. 334,059
In France June 3, 1939

3 Claims. (Cl. 88—24)

Enlargers are known in which the projection unit is connected to the supporting column by means of two parallel four-bar motions, the balancing being obtained by means of two coil springs respectively connecting the lower movable pivotal joints and points of the fixed sides of the four-bar motions. The balancing obtained by means of this device is not constant, the length and, consequently, the tension of the spring varying according to the position of the projection unit: the action of the spring is more important in the lower position than in the higher position, so that if it is very easy to lift the projection unit, it is necessary, for lowering it, to use so much the more force as it is to be lowered farther.

One of the improvements forming the subject-matter of the present invention is adapted to remedy this inconvenience by balancing the projection unit by means of a counterweight sliding within the supporting column. The balancing thus obtained can be absolutely rigorous and constant so that an insignificant effort is sufficient—simply used for overcoming the frictions of the pivotal joints—for moving the apparatus downwardly as for moving it upwardly.

On the other hand, enlargers with automatic focussing are known in which the displacement of the projection unit produces, through the action of a cam, the relative displacement of the lens with respect to the negative-holder, so that the focussing is constantly maintained whatever may be the ratio of enlargement. One of the features of the present invention consists in arranging said cam on a cam-carrier connected to two pivoting branches of one of the above mentioned four-bar motions, by two pivotal joints located on a straight line parallel to the other branches of the four-bar motion. The cam thus moves at the same time as the lens-holder and its movement is a circular movement of translation parallel to that of the lens-holder but of less amplitude. This difference of amplitude allows of generating, from the cam, for instance through the medium of a bell crank lever, the relative movement of the lens-holder with respect of the frame of the projection unit, that is to say relatively to the negative-holder, which movement automatically maintains the focussing.

The main advantages of this new arrangement of the cam are the following:

1. The difference between the amplitude of the movement of the lens-holder and the amplitude of the movement of the cam is so much the greater as the latter is mounted on the branches of the four-bar motion which are nearer the support. At the limit, the cam, mounted on the support itself would be fixed. But, the greater the difference of amplitude between the movements, the larger must be the cam. The assemblage according to the invention allows of choosing, among all the possible positions of the cam, the most advantageous, so that the cam should not be too cumbersome, nor too small, which be prejudicial to the accuracy of the focussing.

2. The assemblage of the cam, in a position quite clear of the apparatus, remote from the projection unit, allows of easily mounting several cams corresponding to several interchangeable lenses. These various cams may be juxtaposed, or some of them can be placed on one of the four-bar motions and the others on the opposite four-bar motion.

A third feature of the present invention consists in the possibility of perfectly adjusting the lamp owing to the fact that the latter can take any desired positions, its socket being capable of being moved and locked in three directions, one vertical, the two others horizontal.

A fourth feature resides in the fact that the negative-holder is constituted in such a manner that the negative can be moved, within the latter when it is in position in the apparatus, without danger of becoming scratched. For that purpose, the negative is placed in the negative-holder, if it is a film of small size (for instance 24 x 36 mm.) between the platen of the negative-holder perforated with a suitable opening, and a glass plate; if it is a film of larger size (for instance 6 x 9 cm.), between two glass plates; if it is a plate, on the platen of the negative-holder; in such a manner that the upper glass plate or photographic plate itself is supported by four spring catches which thus provide an interval either between the glass plate and the platen (small size), or between the two glass plates (large size), or between the photographic plate itself and the platen.

A device pressing against the upper plate causes the spring catches to withdraw into their housings to finally secure the negative when it is perfectly centered.

A fifth particularity of the invention consists in the fact that this pressure device is essentially constituted by two pressure levers, located on either side of the base of the lantern, normally held in pressing position by two springs and lifted by the action of a link-work controlled by a knob placed outside said base of the lantern.

Apparatus having interchangeable lenses are known in which the latter are either permanently secured on a revolving mounting, or placed in position individually by bayonet assemblage. The first device is cumbersome. The bayonet assemblage lacks precision.

A sixth feature of the present invention concerns an assembling device in which the mountings of the lenses are held on the lens-holder by pressure exerted according to surfaces and not according to points, which allows of obtaining a great accuracy of assemblage: the mountings of the lenses are clamped against the lens-holder by an intermediate crown, which is, in its turn, clamped thereagainst by a pressure ring screwed on a cylindrical bearing of the lens-holder.

For allowing the assemblage, each of the mountings of the lenses carries male bearings, for instance three, uniformly distributed at its periphery, corresponding to female notches formed in the intermediate crown, in such a manner that the mountings can pass through the crown in a certain position, but cannot do so in a position differing from the first one to the extent of a fraction of a revolution. The mountings can pass through the clamping collar, but the intermediate crown cannot. Claws prevent the intermediate crown from rotating relatively to the lens-holder. An abutment stops the rotary movement of the lens when it is in position.

For mounting a lens the operator effects the three following movements:

1. He introduces the lens by an upward movement of translation;
2. He rotates it through a fraction of a revolution;
3. He locks it in position by screwing the clamping collar.

The accompanying drawings illustrate by way of example, a photographic enlarger to which are applied the various improvements forming the subject-matter of the present invention.

Figs. 7, 8, 9 and 10 illustrate a negative-holder: Fig. 7 is a plan view, Figs. 8 and 9 are longitudinal and cross sections made according to lines VIII—VIII and IX—IX of Fig. 7, and Fig. 10 is a partial section showing the detail of a spring catch.

Figs. 11 and 12 illustrate the device for clamping the negative: Fig. 11 is a plan view of the bottom of the lantern, Fig. 12 a vertical longitudinal section of the latter.

Fig. 13 is a vertical section of the unit composed of the lens-holder, the female intermediate crown, the male mounting of the lens and the clamping collar, in position; Fig. 14 shows these four members in perspective view in their relative positions when they are placed in position.

Figure 1:
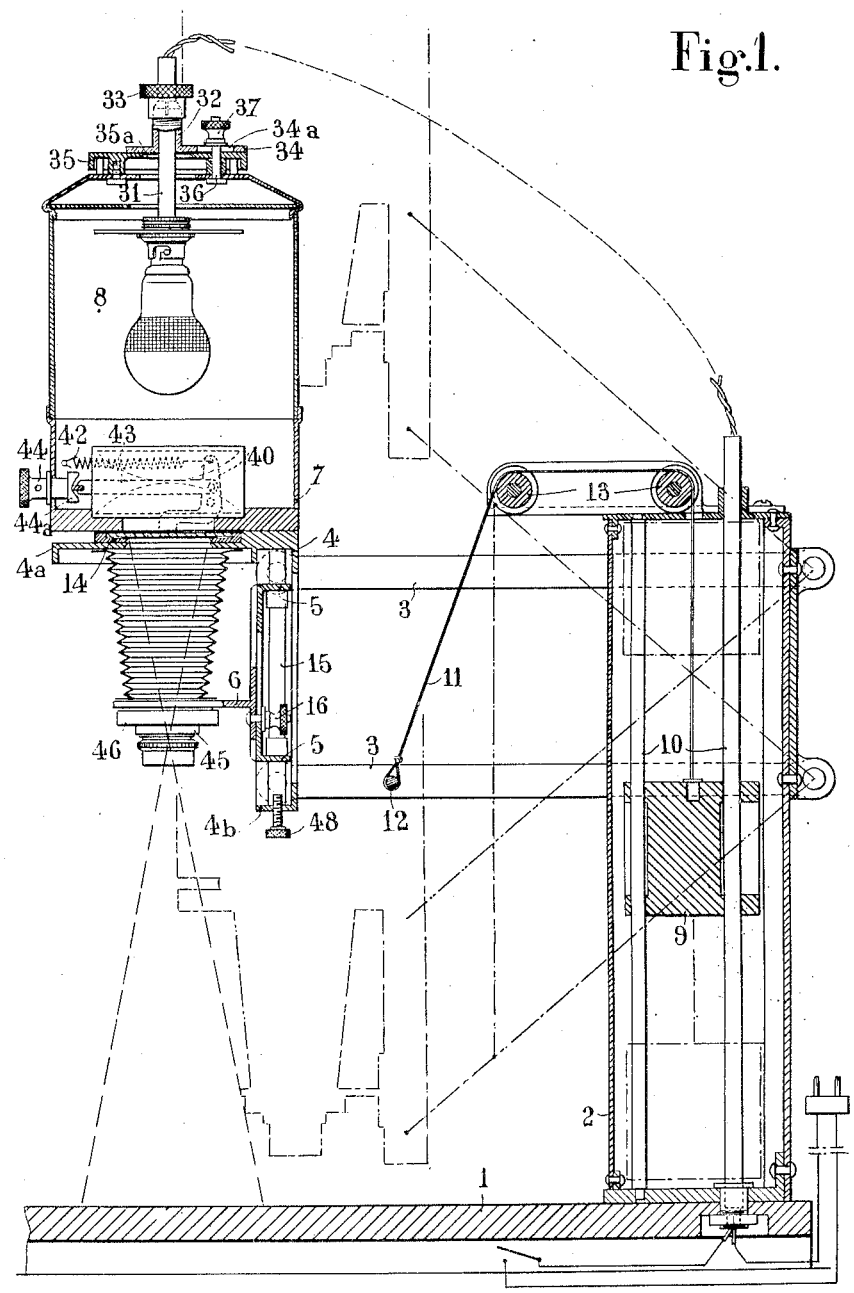
Fig. 1 illustrates a vertical longitudinal section of the apparatus.
Figure 2:
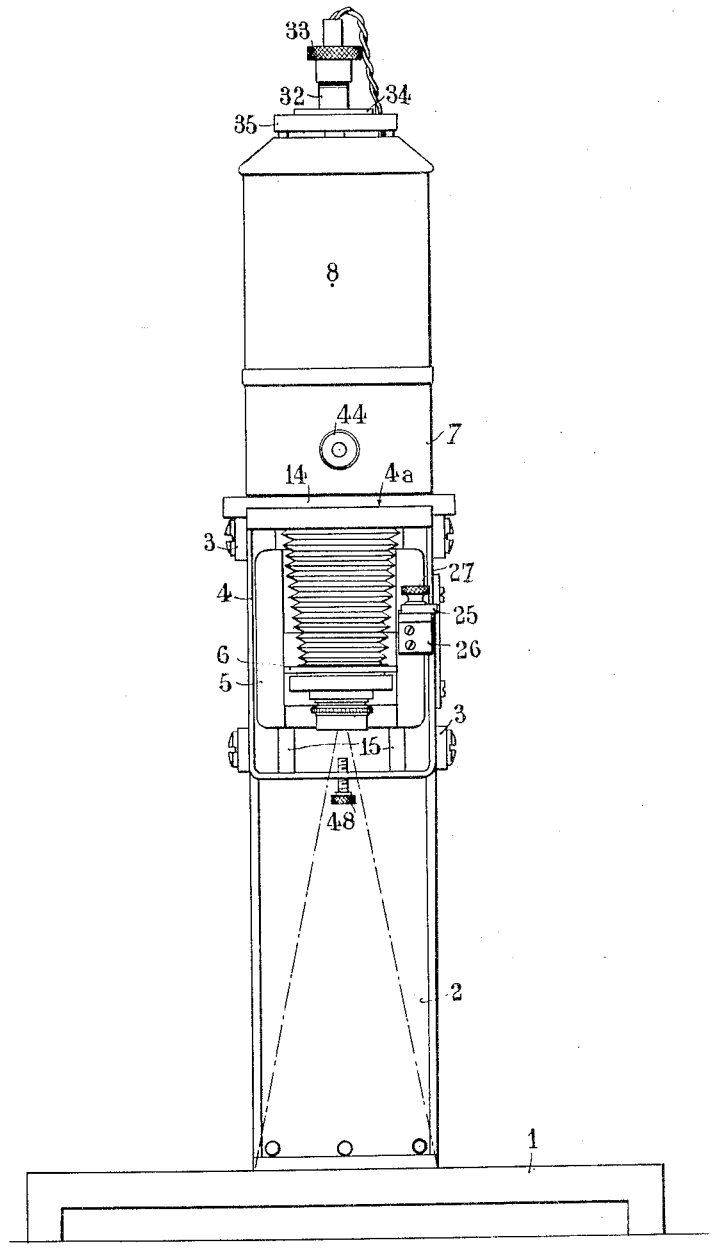
Fig. 2 is a front view thereof.

On a base plate 1 is mounted a column 2 which supports, through the medium of arms 3 forming two vertical four-bar motions, the projection unit essentially constituted by a frame 4, a lens-holder carriage 5, a lens-holder 6 and a lantern comprising a base 7 and a hood or cover 8.

A counterweight 9 guided by rods 10, one of which serves for the passage of the flexible wires supplying the lamp, slides within the column 2. It is connected to a stay 12 joining the two lower arms 3, by a steel rope 11 which passes over two transmission pulleys 13 mounted at the top of the column 2. The frame 4 of the projection unit has the general shape of a bracket the horizontal part 4a of which supports the negative-holder 14 and the vertical part 4b of which forms a frame pivoted at its four angles to the levers 3 and carrying two vertical rods 15 on which slides the lens-holder carriage 5. The lens-holder 6 has the shape of a bracket the horizontal part of which supports the lens and the vertical part of which slides vertically in the carriage 5 and can be locked therein in any position by tightening a nut 16.

Figure 3:
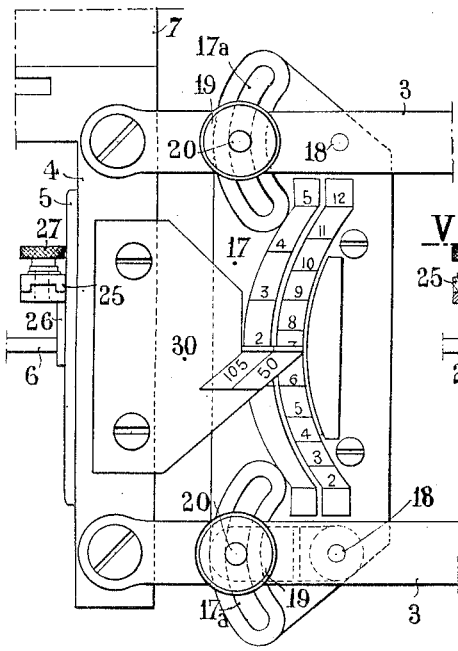
Figure 3 is a partial side view showing the cam-carrier.

On one of the four-bar motions is mounted (Fig. 3) a plate forming a cam-carrier 17 pivoted by means of bolts 18 to the two arms 3. The cam-carrier can be locked against the arms 3, for holding the projection unit stationary in the position corresponding to the ratio of enlargement chosen, by tightening milled nuts 19 the bolts 20 of which slide, during the distortion of the four-bar motions in circular guides 17a formed in the cam-carrier.

Figure 4:
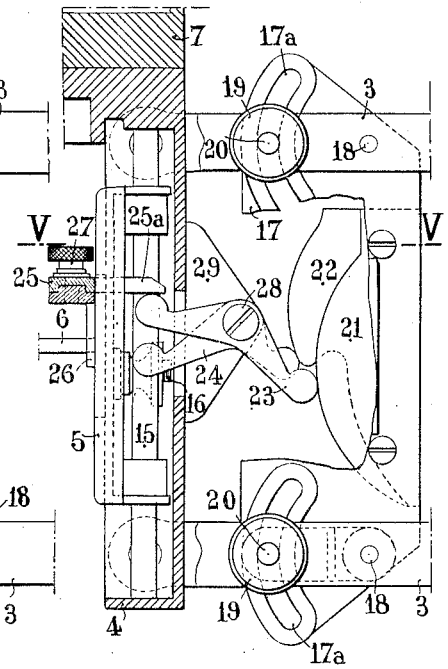
Fig. 4 is a partial side view, the cam-carrier and the carriage support being broken away to show the cams and the links controlling the lens-holder.
Figure 5:
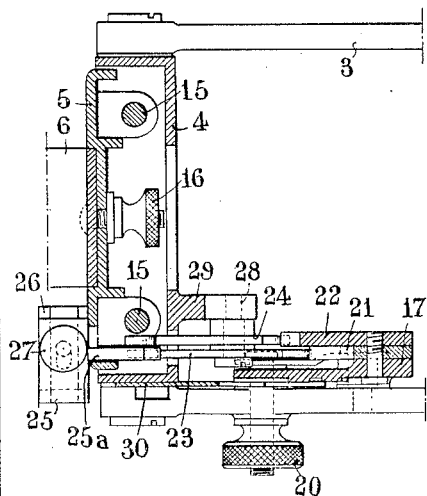
Fig. 5 is a partial horizontal section made according to line V—V of Fig. 4, showing the same members.

The apparatus illustrated being assumed to utilise two lenses, two cams 21 and 22 are mounted on the cam-carrier (Figs. 4 and 5). They act respectively, one or the other, through the medium of two bent levers 23 and 24, on a finger 25a of a member 25 rigid with the lens-holder carriage 5. In the drawings, the cam 21 acts by means of the lever 23 on the finger 25a. The lever 24, pushed by the cam 22, freely rotates and encounters no member in its vertical plane.

For allowing to use sometimes one cam, sometimes the other, the member 25 slides laterally on the right-angled member 26 rigid with the lens-holder carriage 5 and can be locked by the bolt 27 in one or the other of the positions placing the finger 25a opposite one cam or the other.

The two bent levers 23 and 24 rock about a common spindle 28 mounted on a bracket 29 rigid with the frame 4.

The cam-carrier comprises a dial on which a reference member 30 rigid with the frame 4 indicates, for each lens used, the ratio of enlargement corresponding to each position of the four-bar motions.

The base 7 of the lantern is secured on the frame 4 so as to provide between the latter and the horizontal part 4a, a space adapted to receive the negative-holder 14. The hood 8 supporting the lamp fits on the base 7.

Figure 6:
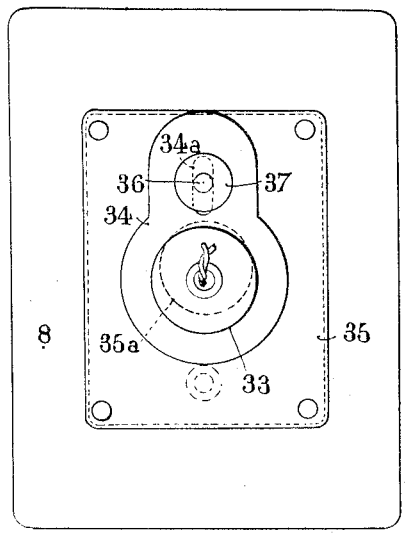
Fig. 6 is a plan view of the top of the lantern, showing the device for adjusting the lamp.

The lamp is mounted at the end of a rod 31 capable of sliding within the slotted socket having a conical bearing 32 and locked on the latter by tightening the milled nut 33. The socket 32 is mounted on a plate 34 clamped on the cover 35 by a bolt 36 and a milled nut 37 (Fig. 6). The plate 34 comprises a guiding groove 34a allowing it to assume, in its plane, all positions by a movement of translation along said groove and movements of rotation about the bolt 36 which passes through it. A circular opening 35a formed in the cover 35 allows the lateral play of the rod 31 during these movements. The lamp, having three degrees of freedom can thus be adjusted in any position so as to produce a perfectly constant illumination of all the points of the negative.

Figs. 7, 8, 9 and 10 show a negative-holder for a film bearing images of 24 x 36 mm. Of course, the same principles of construction might be applied to frames for any other sizes of films, in films or individual images, or of plates.

The negative-holder illustrated is essentially carried by a frame 14 and a pressure glass plate 38.

The frame comprises two guides 14a which hold it in it stranslation on the horizontal part of the frame 4, lateral flanges 14b in which are provided two openings 14c allowing the passage of the film which bears against the rounded and carefully polished inclines 14d, an opening 14e gauged to the size 24 x 36 mm., the housings for four spring catches 39 which support the glass plate 38 and provide between it and the frame 14, an interval greater than the thickness of the film, which allows of sliding the latter to place it perfectly in position, without scratching it. When this final position is chosen, a pressure device presses against the glass plate which pushes back the spring catches and firmly applies the film to the frame at the same time as it holds the latter on the frame 4.

This pressure device is arranged in the base 7 of the lantern (Figs. 11 and 12). It is composed of two bent levers 40 pivoted on horizontal spindles 41 rigid with the base 7, normally pulled by springs 42 located along the lateral walls of the base 7, in such a manner that their active portions 40a are in the lower position; said levers are capable of being pushed by a fork 43 actuated by a knob 44 so that their said portions 40a are moved to the upper position. The milled knob 44 pushes the fork 43 through the medium of a crown forming a cam 44a in such a manner that by simply rotating the milled knob through a quarter of a revolution, it pushes the fork 43 and releases the negative and the negative-holder. The fork 43 is supported and guided by a rod 43a which slides in the knob 44.

Figure 13:
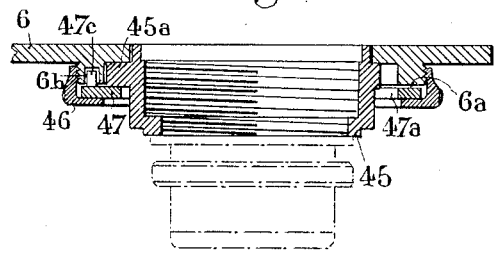
Figs. 13 and 14 illustrate the device for mounting the lens.
Figure 14:
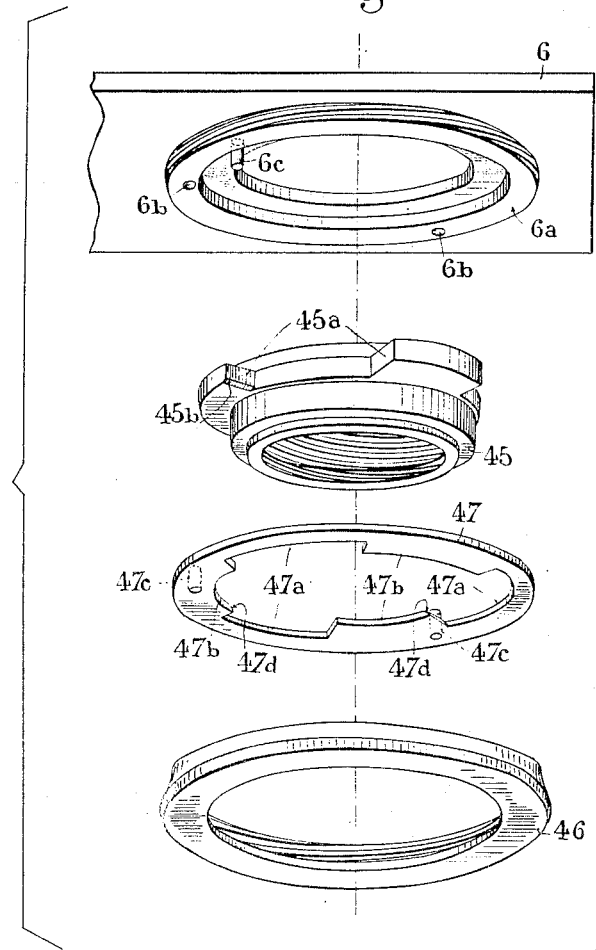

The mounting 45 of the lens is clamped against the lens-holder 6 by a screw threaded collar 46 acting through the medium of a crown 47 (Figs. 13 and 14). It is provided with three bearings 45a uniformly spaced on its outer vertical surface and respectively extending through slightly less than a sixth of the circumference. The crown 47 comprises three inner notches 47a also spaced apart and respectively extending over a sixth of the circumference, providing between them three bearings 47b. It is mounted once for all against a circular projection 6a provided on the lens-holder 6, held in position by the collar 46 and prevented from rotating by claws 47c which engage in corresponding holes 6b of the projection 6a. This projection 6a provides, between the lower surface of the lens-holder and the bearings 47b of the crown, intervals in which fit the bearings 45a when the mounting 45 is introduced vertically in the lens-holder 6 then rotated through a sixth of a revolution. A claw 6c of the lens-holder forms an abutment against which stops one of the bearings 45a of the mountings. For facilitatnig the passage of the bearings 45a on the bearings 47b they are respectively provided with inclines 45b and 47d.

When the mounting is placed in position, it is finally locked by clamping the collar 46 the screw thread of which fits against a screw thread formed on the circular projection 6a. The mounting of the lens is thus clamped according to the horizontal surfaces of the bearings 45a, between the lens-holder 6 and the bearings 47b of the intermediate crown 47. This clamping according to important surfaces allows of obtaining great accuracy of assemblage.

The method of utilisation and the operation of the apparatus are as follows:

For a given lamp, its position is adjusted once for all by means of the milled knobs 33 and 37, so as to obtain a uniform illumination throughout the luminous area projected on the board 1. A lens being chosen, it is mounted on the lens-holder by the well-known movement of bayonet assemblage, and the collar 46 is tightened. According as use is made of a long focus lens or a short focus lens, the lens-holder 6 is placed at the lowest or highest point of its path on the carriage 5 and it is locked in position by tightening the nut 16.

The member 25 is placed in position so that its finger 25a is in contact with the lever 23 or 24 corresponding to the lens chosen, and it is locked in this position by tightening the milled knob 27.

Assuming that a film having a succession of views of 24 x 36 mm. is under consideration. Having, outside the apparatus, arranged the film between the frame 14 and the glass plate 38 in such a manner that its two ends extend through the openings 14c, the whole is introduced in the space provided between the frame 4 and the base 7 of the lantern. By acting on the two free ends of the film it is placed rigorously in the desired position. It is locked in this position and the frame is held stationary at the same time by rotating the milled knob 44 through a quarter of a revolution, which slackens the springs 42 and, by the rocking of the bent levers 40, presses their bearings 40a against the glass plate 38 which, after retracting the spring catches 39, presses the film against the frame 14 and the latter against the frame 4.

There is nothing else to be done now, but to choose the ratio of the enlargement by actuating the four-bar motions which, moving the cams 21 and 22 relatively to the frame 4, determines, through the medium of the bent lever 23 or 24 employed, and of the finger 25a, the displacement of the lens-holder carriage 5 in such a manner that the image projected on the board 1 constantly remains focussed.

The lens-holder 6 can be secured on the carriage 5 in a position which is variable between the above mentioned extreme positions on the carriage 5, only in the case when use is made of a lens the focal length of which is intermediate those of the two lenses provided above. The focussing is then effected by hand. The carriage 5, released from the action of the cams by removing the member 25, then rests on a screw 48 mounted at the lower part of the frame 4. The focussing is effected in two operations: first of all an approximate focussing by sliding the lens-holder 6 on the carriage 5, then an accurate focussing by sliding the carriage 5 in the frame 4 by means of the screw 48.

The forms and proportions of the various parts and constituent elements of the apparatus can of course be varied without departing thereby from the scope of the invention, and their arrangement can even be changed provided that the operation remains substantially identical to that described above.

The invention also includes the apparatus to which only one or some of the improvements forming the subject-matter of the invention are applied.

I claim:

1. In a photographic enlarger, the combination of a base plate, a column on said plate, two pairs of arms of the same length, pivoted at one end on each side of said column at points located in one and the same plane and forming two identical four-bar motions, a frame pivoted at the other ends of said arms and forming one side of said four-bar motion, said frame being intended to carry an enlarging projector, a lens movable on said projector, means for vertically guiding said lens, a link pivoted on two parallel arms of one of said four-bar motions and parallel to said frame, means for transmitting to the lens the relative movement between said frame and said link, and means for rendering said link rigid with said arms, said means for transmitting to the lens the relative movement between said frame and said link being formed by a cam rigid with said link, a two-arm lever pivoted on said frame and one of the arms of which cooperates with said cam and the other arm of which acts on said lens to vertically move it.

2. In a photographic enlarger, the combination of a base plate, a column on said plate, two pairs of arms of the same length, pivoted at one end on each side of said column at points located in one and the same plane and forming two identical four-bar motions, a frame pivoted at the other ends of said arms and forming one side of said four-bar motion, said frame being intended to carry an enlarging projector, a lens movable on said projector, means for vertically guiding said lens, a link pivoted on two parallel arms of one of said four-bar motions and parallel to said frame, means for transmitting to the lens the relative movement between said frame and said link, and means for rendering said link rigid with said arms, said means for rendering said link rigid with said arms being formed by curved grooves provided in said link and concentric with the pivotal points of said link on said arms and by screw threaded rods rigid with said arms, passing through said grooves and carrying nuts adapted to clamp said link against said arms.

3. In a photographic enlarger, the combination of a base plate, a column on said plate, two pairs of arms of the same length, pivoted at one end on each side of said column at points located in one and the same plane and forming two identical four-bar motions, a frame pivoted at the other ends of said arms and forming one side of said four-bar motion, said frame being intended to carry an enlarging projector, a lens movable on said projector, means for vertically guiding said lens, a link pivoted on two parallel arms of one of said four-bar motions and parallel to said frame, means for transmitting to the lens the relative movement between said frame and said link, and means for rendering said link rigid with said arms, said link bearing a graduation indicating the enlargement ratios and said frame carrying an index extending above said graduation.

JULIEN TESSIER.